US012394093B2

(12) United States Patent
Stenborg et al.

(10) Patent No.: US 12,394,093 B2
(45) Date of Patent: Aug. 19, 2025

(54) METHOD AND DEVICE FOR CALIBRATING A CAMERA MOUNTED ON A VEHICLE

(71) Applicant: ZENSEACT AB, Gothenburg (SE)

(72) Inventors: Erik Stenborg, Gothenburg (SE); Harald Kjellson-Freij, Gothenburg (SE); David Tingdahl, Mölndal (SE); David Samuelsson, Sätila (SE)

(73) Assignee: ZENSEACT AB, Gothenburg (SE)

( * ) Notice: Subject to any disclaimer, the term of this patent is extended or adjusted under 35 U.S.C. 154(b) by 63 days.

(21) Appl. No.: 18/398,103

(22) Filed: Dec. 27, 2023

(65) Prior Publication Data

US 2024/0221219 A1    Jul. 4, 2024

(30) Foreign Application Priority Data

Dec. 28, 2022    (EP) .................................... 22216952

(51) Int. Cl.
*G06T 7/80*    (2017.01)
*B60W 60/00*    (2020.01)
(Continued)

(52) U.S. Cl.
CPC .................. *G06T 7/80* (2017.01); *G06T 7/10* (2017.01); *G06T 7/20* (2013.01); *G06V 10/50* (2022.01);
(Continued)

(58) Field of Classification Search
CPC .... G06T 7/70; G06T 7/10; G06T 7/20; G06T 7/80; G06T 7/85; G06T 2207/10016; G06T 2207/20081; G06T 2207/30244; G06T 2207/30252; H04N 17/002; G06V 20/70; G06V 20/58; G06V 20/10; G06V 10/50;
(Continued)

(56) References Cited

U.S. PATENT DOCUMENTS

| 9,955,056 B2* | 4/2018 | Nagaraja | H04N 23/45 |
| 11,577,748 B1* | 2/2023 | Wang | B60W 60/001 |

(Continued)

OTHER PUBLICATIONS

Ishikawa, Ryoichi et al.; "LiDAR and Camera Calibration using Motion Estimated by Sensor Fusion Odometry"; arxiv.org, Cornell University Library; Apr. 14, 2018; 8 pages; XP080870771.
(Continued)

*Primary Examiner* — Brian P Yenke
(74) *Attorney, Agent, or Firm* — Sage Patent Group

(57) ABSTRACT

A method for calibrating a set of extrinsic parameters of a camera mounted on a vehicle is disclosed. The method includes: obtaining a sequence of images, wherein each image depicts a portion of a surrounding environment of the vehicle determining a set of feature points in the sequence of images; determining an area representing a sky in the sequence of images; removing a subset of feature points belonging to the area representing the sky, thereby forming an updated set of feature points; determining a first motion trajectory of the vehicle based on the updated set of feature points; obtaining a second motion trajectory of the vehicle which is based on motion data obtained from other sensors of the vehicle; and calibrating the camera by adjusting the set of extrinsic parameters of the camera based on a difference between the first motion trajectory and the second motion trajectory.

15 Claims, 4 Drawing Sheets

(51) Int. Cl.
 *G06T 7/10* (2017.01)
 *G06T 7/20* (2017.01)
 *G06V 10/50* (2022.01)
 *G06V 10/77* (2022.01)
 *G06V 20/10* (2022.01)
 *G06V 20/58* (2022.01)
 *G06V 20/70* (2022.01)

(52) U.S. Cl.
 CPC .............. *G06V 10/77* (2022.01); *G06V 20/10* (2022.01); *G06V 20/58* (2022.01); *G06V 20/70* (2022.01); *B60W 60/00* (2020.02); *B60W 2420/403* (2013.01); *B60W 2420/408* (2024.01); *G06T 2207/10016* (2013.01); *G06T 2207/20081* (2013.01); *G06T 2207/30241* (2013.01); *G06T 2207/30244* (2013.01); *G06T 2207/30252* (2013.01)

(58) Field of Classification Search
 CPC G06V 10/77; B60W 60/00; B60W 2420/408; B60W 2420/403
 See application file for complete search history.

(56) References Cited

U.S. PATENT DOCUMENTS

| | | | | |
|---|---|---|---|---|
| 11,772,667 | B1* | 10/2023 | Daly, Jr. ........... | B60W 60/0053 701/29.2 |
| 12,277,783 | B2* | 4/2025 | Verbeke .................... | G06T 7/20 |
| 2010/0329513 | A1 | 12/2010 | Klefenz | |
| 2011/0316980 | A1* | 12/2011 | Dubbelman ......... | G06V 10/757 348/47 |
| 2015/0201180 | A1* | 7/2015 | Mourikis ............... | H04N 23/90 348/46 |
| 2016/0284087 | A1* | 9/2016 | Natroshvili .............. | G06T 7/80 |
| 2019/0102911 | A1* | 4/2019 | Natroshvili ............... | G06T 7/85 |
| 2020/0005489 | A1* | 1/2020 | Kroeger, III ............... | G06T 7/85 |
| 2020/0026283 | A1* | 1/2020 | Barnes .................. | G06V 10/774 |
| 2020/0088858 | A1* | 3/2020 | Li ........................... | G01S 7/497 |
| 2020/0090322 | A1* | 3/2020 | Seo ........................ | G06N 3/084 |
| 2020/0355820 | A1* | 11/2020 | Zeng ..................... | G01S 13/865 |
| 2021/0001776 | A1 | 1/2021 | Kim et al. | |
| 2021/0192788 | A1* | 6/2021 | Diederichs ............ | G01S 17/931 |
| 2021/0272289 | A1 | 9/2021 | Cai et al. | |
| 2021/0342600 | A1* | 11/2021 | Westmacott ........ | G06F 18/2148 |
| 2022/0051028 | A1* | 2/2022 | Nakano .................... | G08G 1/04 |
| 2022/0138969 | A1* | 5/2022 | Forsgren ............... | G01S 13/867 382/103 |
| 2023/0117253 | A1* | 4/2023 | Molad ....................... | G06T 7/20 382/103 |
| 2023/0343229 | A1* | 10/2023 | Shapira ..................... | G08G 5/55 |
| 2023/0401745 | A1* | 12/2023 | Kothari ..................... | G06T 7/70 |
| 2024/0078684 | A1* | 3/2024 | Kerofsky .................. | G06T 7/74 |
| 2024/0103525 | A1* | 3/2024 | Lee ........................... | G06T 7/60 |
| 2024/0196104 | A1* | 6/2024 | Taylor .................... | H04N 23/76 |
| 2024/0196105 | A1* | 6/2024 | Taylor ....................... | G06T 7/90 |
| 2024/0230866 | A1* | 7/2024 | Ma ............................ | G06T 7/10 |
| 2024/0282006 | A1* | 8/2024 | Wang .................... | G06V 10/44 |

OTHER PUBLICATIONS

Tao, Wenyu et al.; "A sky region segmentation method for outdoor visual-inertial SLAM"; 2021 IEEE 6th International Conference on Intelligent Computing and Signal Processing (ICSP); Apr. 9, 2021; pp. 1108-1113 (6 pages); XP033906732.

Extended European Search Report mailed Jun. 26, 2023 for European Application No. 22216952.6, 7 pages.

* cited by examiner

METHOD AND DEVICE FOR CALIBRATING A CAMERA MOUNTED ON A VEHICLE

CROSS-REFERENCE TO RELATED APPLICATIONS

The present application for patent claims priority to European Patent Office Application Ser. No. 22216952.6, entitled "A METHOD AND DEVICE FOR CALIBRATING A CAMERA MOUNTED ON A VEHICLE" filed on Dec. 28, 2022, assigned to the assignee hereof, and expressly incorporated herein by reference.

TECHNICAL FIELD

The present inventive concept relates to the field of autonomous vehicles. In particular, but not exclusively, it is related to methods and devices for calibrating a set of extrinsic parameters of a camera mounted on a vehicle.

BACKGROUND

With the development of technology in recent years, image capturing and processing techniques has become widely used in different fields of technology. In particular, vehicles produced today are commonly equipped with some form of vision or perception system for enabling new functionalities.

Examples of such functionalities are advanced driver-assistance systems (ADAS) which are being implemented in an increasing portion of modern vehicles, to increase vehicle safety and more generally road safety. ADAS—which for instance may be represented by adaptive cruise control (ACC), collision avoidance system, forward collision warning, lane support systems, etc.
  are electronic systems that may aid a vehicle driver while driving. Today, there is ongoing research and development within a number of technical areas associated to both the ADAS and the Autonomous Driving (AD) field. ADAS and AD may also be referred to under the common term Automated Driving System (ADS) corresponding to all of the different levels of automation as for example defined by the SAE J3016 levels (0-5) of driving automation.

Cameras are an important type of sensor of vision or perception system, especially for autonomous vehicles, as they can be used in detecting, classifying, and measuring things in a surrounding environment of the vehicle. To get accurate measurements from the cameras, it is important that their mounting pose (i.e. position and orientation) relative to the body of the vehicle is accurately known. After the vehicle is assembled, there is typically a calibration procedure (also called factory extrinsic calibration) that determines this pose. However, there are several factors that could change the pose of a camera after this calibration, such as replacement of a windscreen, heat expansion of various parts, mounting fixtures loosening, etc. To detect and compensate for these types of events, there is need for continuously monitoring and adjusting the extrinsic calibration.

However, with today's solutions, there is a risk of errors being introduced in the adjustment process, leading to change of the calibration in an undesired way. This will in turn affect any downstream functionalities which relies on data from the camera. There is therefore a need for new and improved solutions for performing calibration of vehicle-mounted cameras.

SUMMARY

The herein disclosed technology seeks to mitigate, alleviate, or eliminate one or more of the above-identified deficiencies and disadvantages in the prior art to address various problems relating to dynamic calibration of vehicle-mounted cameras.

In general, this dynamic (extrinsic) calibration of vehicle-mounted cameras is typically performed by determining a camera-based motion estimation (also referred to as visual odometry) using the camera to be calibrated and comparing it with a motion estimation based on other motion sensors (also referred to as wheel odometry), such as accelerometers, gyroscopes, and wheel encoders. By comparing these trajectories, it is possible to find out if the camera has moved and by how much, and to compute a new calibration to compensate for the movement.

If there is an error in the motion estimation based on visual odometry, this may lead to an undesirable change of the calibration. The inventors have realized that the calibration process is in particular vulnerable to long-term offset (bias) from a skewed distribution of input data. One such cause for bias in the visual odometry estimation has been found to be slowly moving objects which are mistakenly treated as stationary objects during the visual odometry. In particular, the inventors have realized that clouds are one example of such objects. The clouds have high enough image gradient to generate an amount of feature points, while being slow enough that the known process for excluding moving objects is not effective. Today's techniques for excluding feature points belonging to moving objects are not effective in handling these types of slowly moving objects, leading to these feature points being used in the visual odometry which causes the orientation component of the motion estimation to get a bias. The present technology therefore presents solutions for improving these aspects, with respect to camera calibration.

Various aspects and embodiments of the disclosed technology are defined below and in the accompanying independent and dependent claims.

According to a first aspect of the disclosed technology, there is provided a computer-implemented method for calibrating a set of extrinsic parameters of a camera mounted on a vehicle. Further, the method comprises obtaining a sequence of images, captured by the camera, wherein each image of the sequence of images depicts a portion of a surrounding environment of the vehicle in a respective time instance of a plurality of time instances. Further, the method comprises determining a set of feature points in the sequence of images. Further, the method comprises determining an area representing a sky in the sequence of images. Further, the method comprises removing, from the set of feature points, a subset of feature points, the subset of feature points belonging to the area representing the sky, thereby forming an updated set of feature points. Further, the method comprises determining a first motion trajectory of the vehicle over the plurality of time instances, based on the updated set of feature points. Further, the method comprises obtaining a second motion trajectory of the vehicle over the plurality of time instances, wherein the second motion trajectory is based on motion data obtained from one or more other sensors of the vehicle. Further, the method comprises calibrating the camera by adjusting the set of extrinsic parameters of the camera based on a difference between the first motion trajectory and the second motion trajectory.

According to a second aspect of the disclosed technology, there is provided a computer program product. The computer program product comprises instructions which, when the program is executed by a computing device, causes the computing device to carry out the method according to any one of the embodiments of the first aspect. With this second aspect of the disclosed technology, similar advantages and preferred features are present as in the other aspects. In order to avoid undue repetition, reference is made to the above.

According to a third aspect of the disclosed technology, there is provided a (non-transitory) computer-readable storage medium storing one or more programs configured to be executed by one or more processors of a processing device, the one or more programs comprising instructions for performing the method according to any one of the embodiments of the first aspect. With this third aspect of the disclosed technology, similar advantages and preferred features are present as in the other aspects. In order to avoid undue repetition, reference is made to the above.

The term "non-transitory," as used herein, is intended to describe a computer-readable storage medium (or "memory") excluding propagating electromagnetic signals, but are not intended to otherwise limit the type of physical computer-readable storage device that is encompassed by the phrase computer-readable medium or memory. For instance, the terms "non-transitory computer readable medium" or "tangible memory" are intended to encompass types of storage devices that do not necessarily store information permanently, including for example, random access memory (RAM). Program instructions and data stored on a tangible computer-accessible storage medium in non-transitory form may further be transmitted by transmission media or signals such as electrical, electromagnetic, or digital signals, which may be conveyed via a communication medium such as a network and/or a wireless link. Thus, the term "non-transitory", as used herein, is a limitation of the medium itself (i.e., tangible, not a signal) as opposed to a limitation on data storage persistency (e.g., RAM vs. ROM).

According to a fourth aspect, there is provided a device for calibrating a set of extrinsic parameters of a mounted on a vehicle. The device comprises control circuitry. The control circuitry is configured to obtain a sequence of images, captured by the camera, wherein each image of the sequence of images depicts a portion of a surrounding environment of the vehicle in a respective time instance of a plurality of time instances. Further, the control circuitry is configured to determine a set of feature points in the sequence of images. Further, the control circuitry is configured to determine an area representing a sky in the sequence of images. Further, the control circuitry is configured to remove, from the set of feature points, a subset of feature points belonging to the area representing the sky. Further, the control circuitry is configured to determine a first motion trajectory of the vehicle over the plurality of time instances, based on the set of feature points. Further, the control circuitry is configured to obtain a second motion trajectory of the vehicle over the plurality of time instances, wherein the second motion trajectory is based on motion data obtained from one or more other sensors of the vehicle. Further, the control circuitry is configured to calibrate the set of extrinsic parameters of the camera by adjusting an extrinsic parameter of the camera based on a difference between the first motion trajectory and the second motion trajectory. With this fourth aspect of the disclosed technology, similar advantages and preferred features are present as in the other aspects. In order to avoid undue repetition, reference is made to the above.

According to a fifth aspect, there is provided a vehicle. The vehicle comprises a camera mounted on the vehicle, and a device for calibrating the camera mounted on the vehicle, according to any of the embodiments of the fourth aspect. With this fifth aspect of the disclosed technology, similar advantages and preferred features are present as in the other aspects. In order to avoid undue repetition, reference is made to the above.

The disclosed aspects and preferred embodiments may be suitably combined with each other in any manner apparent to anyone of ordinary skill in the art, such that one or more features or embodiments disclosed in relation to one aspect may also be considered to be disclosed in relation to another aspect or embodiment of another aspect.

A possible advantage of some embodiments of the proposed technology is that an improved accuracy and performance of the dynamic extrinsic calibration is achieved. More specifically, determining the area representing the sky, and removing feature points belonging to that area may lead to a more robust calibration process which less often drifts away from the correct calibration. In particular, the performance over longer distance/time may be improved, since the influence of a long term bias can be reduced.

The present technology may be implemented using homogeneous coordinates to represent the triangulated feature points in the three dimensional environment of the vehicle. This makes it possible to have feature points far away from the camera (also referred to as infinity points) and still make use of them in the visual odometry (as opposed to using Cartesian coordinates). Using feature points far away is advantageous in that it may provide for improved accuracy of the visual odometry. The infinity points are especially useful in the orientation estimation. The use of infinity points is enabled by the proposed solution of removing feature points belonging to the sky, namely by reducing the effects of any drawbacks of using infinity points, which would otherwise be present. It should however be appreciated that Cartesian coordinates may be used as well.

Further embodiments are defined in the dependent claims. It should be emphasized that the term "comprises/comprising" when used in this specification is taken to specify the presence of stated features, integers, steps, or components. It does not preclude the presence or addition of one or more other features, integers, steps, components, or groups thereof.

These and other features and advantages of the disclosed technology will in the following be further clarified with reference to the embodiments described hereinafter. A further scope of applicability of the present disclosure will become apparent from the detailed description given below. However, it should be understood that the detailed description and specific examples, while indicating preferred variants of the present inventive concept, are given by way of illustration only, since various changes and modifications within the scope of the inventive concept will become apparent to those skilled in the art from this detailed description.

BRIEF DESCRIPTION OF THE DRAWINGS

The above aspects, features and advantages of the disclosed technology, will be more fully appreciated by reference to the following illustrative and non-limiting detailed description of example embodiments of the present disclosure, when taken in conjunction with the accompanying drawings, in which.

DETAILED DESCRIPTION

Figure 1:
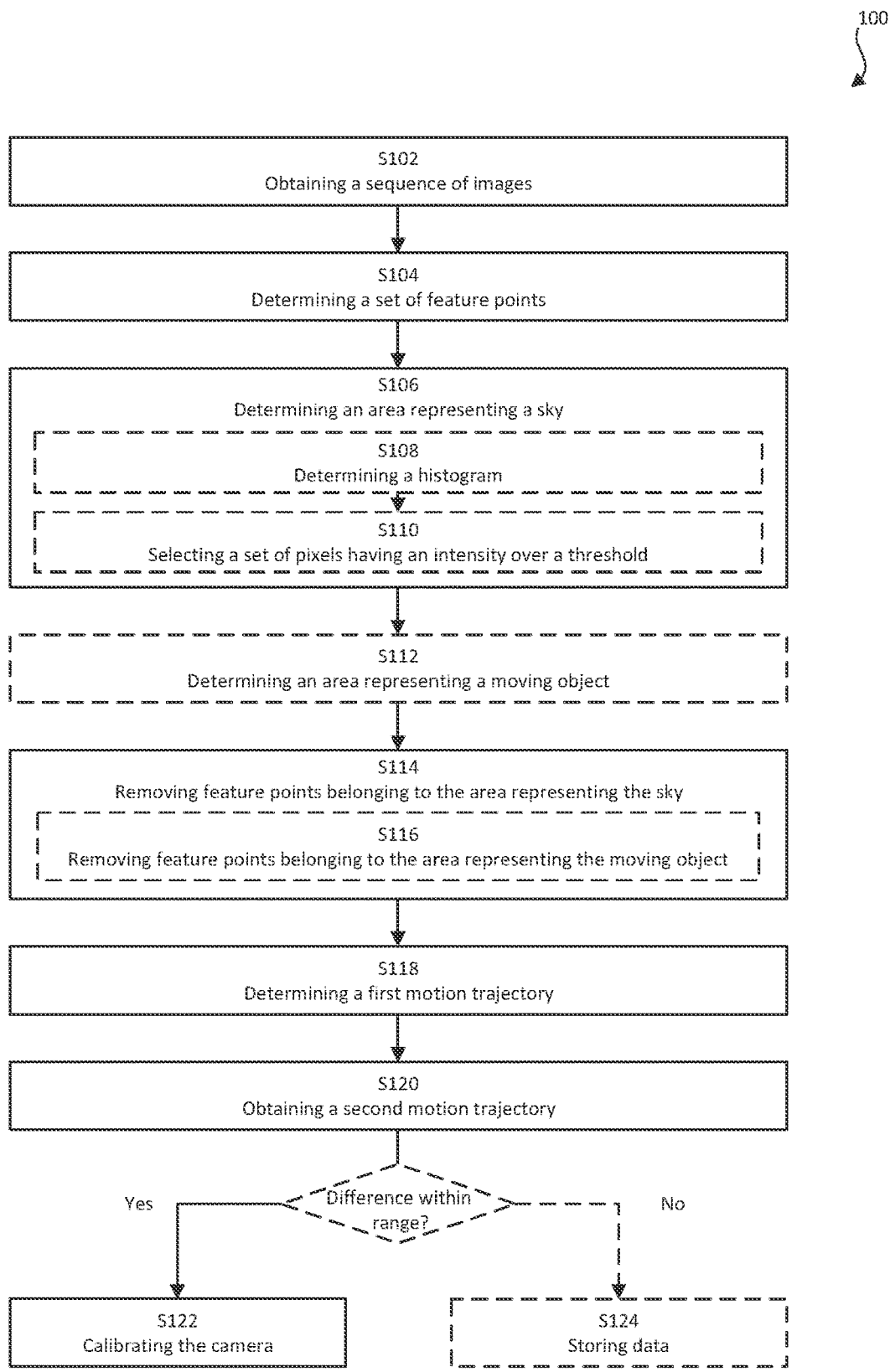
FIG. 1 is a schematic flowchart representation of a computer-implemented method for calibrating a set of extrinsic parameters of a camera mounted on a vehicle in accordance with some embodiments of the present disclosure.

The present disclosure will now be described in detail with reference to the accompanying drawings, in which some example embodiments of the disclosed technology are shown. The disclosed technology may, however, be embodied in other forms and should not be construed as limited to the disclosed example embodiments. The disclosed example embodiments are provided to fully convey the scope of the disclosed technology to the skilled person. Those skilled in the art will appreciate that the steps, services and functions explained herein may be implemented using individual hardware circuitry, using software functioning in conjunction with a programmed microprocessor or general purpose computer, using one or more Application Specific Integrated Circuits (ASICs), using one or more Field Programmable Gate Arrays (FPGA) and/or using one or more Digital Signal Processors (DSPs).

It will also be appreciated that when the present disclosure is described in terms of a method, it may also be embodied in apparatus or device comprising one or more processors, one or more memories coupled to the one or more processors, where computer code is loaded to implement the method. For example, the one or more memories may store one or more computer programs that causes the apparatus or device to perform the steps, services and functions disclosed herein when executed by the one or more processors in some embodiments.

It is also to be understood that the terminology used herein is for purpose of describing particular embodiments only, and is not intended to be limiting. It should be noted that, as used in the specification and the appended claim, the articles "a", "an", "the", and "said" are intended to mean that there are one or more of the elements unless the context clearly dictates otherwise. Thus, for example, reference to "a unit" or "the unit" may refer to more than one unit in some contexts, and the like. Furthermore, the words "comprising", "including", "containing" do not exclude other elements or steps. It should be emphasized that the term "comprises/comprising" when used in this specification is taken to specify the presence of stated features, integers, steps, or components. It does not preclude the presence or addition of one or more other features, integers, steps, components, or groups thereof. The term "and/or" is to be interpreted as meaning "both" as well and each as an alternative.

It will also be understood that, although the term first, second, etc. may be used herein to describe various elements or features, these elements should not be limited by these terms. These terms are only used to distinguish one element from another. For example, a first signal could be termed a second signal, and, similarly, a second signal could be termed a first signal, without departing from the scope of the embodiments. The first signal and the second signal are both signals, but they are not the same signal.

The present technology relates to so called extrinsic calibration of cameras mounted on vehicles. In particular, it relates to a dynamic re-calibration of extrinsic parameters of the camera, which can be performed after an initial (factory) calibration, to correct errors or adjust for changes in the pose of the camera. The "pose" of an object (herein a camera), should throughout the present disclosure be understood as a position and orientation of the object in a given coordinate system (herein a coordinate system of the vehicle). Within the field of computer vision, the pose is typically represented by a combination of translation and rotation parameters, which describe the position and orientation of the object relative to the coordinate system.

Extrinsic calibration refers to the process of determining a pose (i.e. a relative position and orientation) of a camera in relation to a coordinate system. In the present disclosure, the pose of the camera is calibrated in relation to a coordinate system of the vehicle on which the camera is mounted. It should however be appreciated that the principles described herein may also be used for calibrating a camera in relation to any other coordinate systems.

Extrinsic calibration of vehicle-mounted cameras is typically performed by determining a camera-based motion estimation (also referred to as visual odometry) using the camera to be calibrated and comparing it with a motion estimation based on other motion sensors (also referred to as wheel odometry), such as accelerometers, gyroscopes, and wheel encoders. By comparing these trajectories, it is possible to find out if the camera has moved and by how much, and to compute a new calibration to compensate for the movement.

Visual odometry refers to a process of estimating a position and orientation of a camera based on visual information that the camera acquires of its surrounding environment. The process involves tracking the movement of the camera over time, by analyzing a sequence of images taken by the camera. The resulting estimate of the cameras motion may be referred to as the visual odometry estimate. Visual odometry can be used in a variety of applications, including (but not limited to) autonomous vehicles, robotics, and augmented reality.

FIG. 1 is a flowchart illustrating some embodiments of a method 100 for calibrating a set of extrinsic parameters of a camera mounted on a vehicle. In particular, the method 100 may be used to re-calibrate the set of extrinsic parameters, after an initial calibration has been made. The method 100 may for instance be performed after a certain amount of time, or at a set time interval, to ensure that the camera stays calibrated. Alternatively, or in combination, the method 100 may be performed on demand, e.g. in response to detecting that the calibration of the camera has deteriorated.

It should be appreciated that the method 100 of FIG. 1 comprises some steps which are illustrated as boxes in solid lines and some steps which are illustrated in broken lines. The steps which are shown in solid lines are steps which are comprised in the broadest example embodiment of the method 100. The steps which are comprised in broken lines are examples of a number of optional steps which may form part of a number of alternative embodiments. It should be appreciated that these steps need not be performed in order. Furthermore, it should be appreciated that not all of the steps need to be performed. The example steps may be performed in any order and in any combination.

The method 100 is preferably performed by a device such as the device 200 as described below in connection with FIG. 2. The device 200 may be part of an Automated Driving System (ADS) of a vehicle, such as the vehicle 300 as described below in connection with FIG. 3. Thus, the vehicle may be equipped with an ADS. The camera may thus be part of a vision system of the ADS. It should be appreciated that the principles of the present disclosure are applicable to any vehicle-mounted cameras. As used herein, a "vehicle" is any form of motorized transport. For example, the vehicle 300 may be any road vehicle such as a car (as illustrated herein), a motorcycle, a (cargo) truck, a bus, a smart bicycle, etc.

In the following, the different steps are described in more detail with reference to FIG. 1. Even though illustrated in a specific order, the steps of the method 100 may be performed in any suitable order, in parallel, as well as multiple times. For instance, the steps (which is further described below) of determining S118 a first motion trajectory (and the steps leading up to this) and obtaining S120 a second motion trajectory can be performed interchangeably.

The method 100 comprises obtaining S102 a sequence of images, captured by the camera. The term "obtaining" is to, throughout the present disclosure, be interpreted broadly and encompasses receiving, retrieving, collecting, acquiring, and so forth directly and/or indirectly between two entities configured to be in communication with each other or further with other external entities. For example, obtaining S102 the sequence of images may comprise capturing the sequence of images by the camera, or requesting the camera to capture the sequence of images. Alternatively, the sequence of images may be obtained S102 by receiving or retrieving the sequence of images from e.g. a memory, a remote device, or a remote server.

Each image of the sequence of images depicts a portion of a surrounding environment of the vehicle in a respective time instance of a plurality of time instances. The surrounding environment of the vehicle should be understood as a general area around the vehicle in which objects (such as other vehicles, landmarks, obstacles, persons, etc.) can be detected and identified by sensors (radar, LIDAR, cameras, etc.) of the vehicle, i.e. within a sensor range of the vehicle. The depicted portion of the surrounding environment may correspond to a field of view of the camera. The sequence of images should be understood as a series of image frames. Thus, the sequence of images may be a video feed of the camera, depicting a portion of the surrounding environment at different time instances.

Moving on, the method 100 further comprises determining S104 a set of feature points in the sequence of images. As is commonly known in the field of computer vision, feature points refer to distinctive and/or interesting points or regions (or pixel locations) in an image or video, and that can be identified and tracked over time. These points are typically chosen based on their visual characteristics, such as corners, edges, or other unique or distinct patterns in the image. The feature points may for instance be determined by techniques such as corner detection, edge detection, or scale-invariant feature transform (SIFT). These techniques typically operate by extracting and describing the local features around each point, e.g. based on image gradient, histograms of oriented gradients (HOG), or local binary patterns (LBP). Once determined, the feature points can be described using a set of numerical features, such as the location, scale, orientation, and descriptor of the feature point. These features can be used to compare and match feature points across different images or video frames, e.g. as part of a visual odometry process. Thus, a feature point of the set of feature points may be associated with an object in the surrounding environment of the vehicle.

The set of feature points should be understood as comprising a number of feature points for each image of the sequence of images. It should be appreciated that the different images may have different feature points, and a different number of points. In a later step of determining a motion trajectory (as described below), feature points of one image may be linked to corresponding feature points of a subsequent image to determine how the vehicle has moved between two subsequent images. As described above, there are several techniques for determining feature points of images, any of which may be used in an implementation of the proposed solution.

The method 100 further comprises determining S106 an area representing a sky in the sequence of images. Put differently, a region in each image of the sequence of images corresponding to the sky is identified. Determining S106 the area representing the sky in an image of the sequence of images may be done by selecting an upper portion of the image, such as the top 10, 20 or 30 percent of the image. The upper portion of the image may be defined by a portion above a horizon in the image. In another example, determining S106 the area representing the sky of the sequence of images may be performed by semantic segmentation. In other words, the area representing the sky may be determined using image segmentation or any suitable supervised machine learning process.

In some embodiments, determining S106 the area representing the sky comprises, for each image of the sequence of images: determining S108 a histogram of the image and selecting S110 a set of pixels having an intensity over a threshold in the histogram as the area representing the sky. The selection S110 of the set of pixels having an intensity over the threshold may be performed on the upper portion of the image, as explained above. Thus, the area representing the sky may be distinguished from e.g. trees which reach above the horizon. The intensity of the pixels has been found to be a good indication of whether an area depicts a sky or not. The threshold may be a static threshold value, i.e. a set threshold value regardless of the image. Alternatively, the threshold may be a dynamic threshold value, i.e. set based on the specific image (or more specifically, on the intensity distribution of the image). The process of looking at the histogram of the image to determine S106 the area representing the sky provides for a coarse but fast detection algorithm which has proven to be advantageous since it allows for an efficient sky detector.

Moving on, the method 100 further comprises removing S114, from the set of feature points, a subset of feature points, the subset of feature points belonging to the area representing the sky, thereby forming an updated set of feature points. In other words, any feature points that are present in the sky, in any of the images of the sequence of images are removed from the set of feature points. The updated set of feature points may thus be void of feature points of slow moving objects that have been identified in the sky, such as clouds, stars, aircrafts, etc. As explained above, removing these types of feature points may be advantageous in that a long term bias can be prevented from being introduced into the calibration process.

Optionally, the method may further comprise determining S112 an area representing one or more moving objects in the sequence of images. Removing S114, from the set of feature points, the subset of feature points, may further comprise removing S116, from the set of feature points, an additional subset of feature points. The additional subset of feature points belonging to the area representing the one or more moving objects. Put differently, any feature points belonging to moving objects may be excluded from the set of feature points. Moving objects will typically degrade the performance of visual odometry, so removing feature points belonging to these objects prevents this reduction in performance. Determining S112 the area representing the one or more moving objects may be performed using machine leaning based object detection.

The method 100 further comprises determining S118 a first motion trajectory of the vehicle over the plurality of time instances, based on the updated set of feature points. The first motion trajectory may be determined by tracking feature points of the set of feature points over the sequence of images associated with the respective time instances. In other words, the first motion trajectory is determined by visual odometry, as explained in the foregoing. Thus, the first motion trajectory may be seen as a visual odometry estimate.

By the wording "motion trajectory", it is herein meant a trajectory along which the vehicle travels over the plurality of time instances. The motion trajectory may for instance comprise information about a position, velocity and acceleration of the vehicle in each time instance of the plurality of time instances.

Moving on, the method 100 further comprises obtaining S120 a second motion trajectory of the vehicle over the plurality of time instances. The second motion trajectory is based on motion data obtained from one or more other sensors of the vehicle. By the wording "other sensors" it is herein meant any sensors other than the camera to be calibrated. Any sensors suitable for determining a vehicle odometry may be used. The other sensors may for instance be motion sensors, such as an accelerometer, a gyroscope, one or more wheel encoders, etc. The second motion trajectory may in other words be determined by wheel odometry. The other sensors may for instance be an inertial measurement unit (IMU), optionally in combination with wheel encoders. The other sensors may be fixed to the vehicle at or near a point of reference of the vehicle. The second motion trajectory may alternatively be determined by visual odometry. The other sensors may thus comprise a LIDAR or a further camera of the vehicle. In summary, the other sensors may comprise at least one of an accelerometer, a gyroscope, and a wheel encoder, a LIDAR, and a further camera of the vehicle. The second motion trajectory may be determined based on motion data from one other sensor. Alternatively, the second motion trajectory may be determined based on motion data from a plurality of other sensors.

The first and second motion trajectories should be seen as motion trajectories of two different points of reference of the vehicle. The points of reference may be associated with a position and orientation in relation to the vehicle. The first motion trajectory is herein associated with a first point of reference, belonging to the camera to be calibrated. The second motion trajectory is herein associated with a second point of reference, belonging to the one or more other sensors. A calibration of the camera (as will be further described below) may then be seen as a calibration between these two points of reference. The calibration may be defined by a translation and rotation from one of the points to the other. Thus, the second point of reference (of the one or more other sensors of which the second motion trajectory is determined) may serve as a point of reference having a known position and orientation in relation to the vehicle to which the first point of reference (of the camera to be calibrated) can be calibrated.

Obtaining S120 the second motion trajectory may comprise determining the second motion trajectory based on the motion data obtained from the one or more other sensors. The motion data may comprise information pertaining to one or more of a heading, position, velocity, acceleration and/or jerk of the vehicle. Alternatively, the second motion trajectory may be received from another device/server/unit than the one performing the method 100.

The second motion trajectory should be seen as a motion trajectory over the same time instances as the first motion trajectory, but determined based on different sensors than the camera to be calibrated.

Moving on, the method further comprises calibrating S122 the camera by adjusting the set of extrinsic parameters of the camera based on a difference between the first motion trajectory and the second motion trajectory. Thereby, a calibrated set of extrinsic parameters may be formed. The set of extrinsic parameters may be adjusted such that a difference between a first and second motion trajectory of a subsequent plurality of time instances are reduced. Put differently, the camera may be calibrated S122 by adjusting the set of extrinsic parameters based on the difference between the first motion trajectory and the second motion trajectory such that said difference is minimized. It should be appreciated that not all of the extrinsic parameters of the set of extrinsic parameters need to be adjusted. Calibrating the camera may be done by adjusting one or more of the extrinsic parameters of the set of extrinsic parameters.

As another way of seeing it, the first and second motion trajectory may form part of a common motion trajectory to which parameters of the camera and the one or more other sensors (that were used in determining the trajectories) are adjusted to fit. The camera may then be calibrated S112 by adjusting the set of extrinsic parameters of the camera such that the common motion trajectory agrees with both the updated set of feature points and the motion data from the one or more other sensors of the vehicle.

The set of extrinsic parameters of the camera may comprise information about a position and/or an orientation of the camera in relation to the vehicle. In other words, the extrinsic parameters describe how a coordinate system of the camera relates to a coordinate system of the vehicle.

Calibrating S122 the camera may be performed in response to the difference between the first motion trajectory and the second motion trajectory being within a range (Yes path from step S120). This may ensure that cases in which the difference is too large (i.e. outside the range, which may indicate that there is an error in determining the first and/or second motion trajectory) can be disregarded, and thus not used in calibrating the camera. Thus, a method which is more robust against deviations or errors in the result can be achieved. The range may be defined by a lower limit and an upper limit. For example, the range may be a range from the value zero to a certain positive (or negative) value. Alternatively, the range may be defined as a range from a negative value to a positive value.

In response to the difference between the first motion trajectory and the second motion trajectory being outside the range (No path from step S120), the method 100 may further comprise storing S124 data relating to the first and/or second motion trajectory. The stored data may e.g. comprise the first motion trajectory, the set of feature points used in determining the first motion trajectory, the second motion trajectory and/or the motion data used to determine the second motion trajectory. The stored data may be used for further development or analysis of the method 100 or system/device that performs the method 100.

Executable instructions for performing these functions are, optionally, included in a non-transitory computer-readable storage medium or other computer program product configured for execution by one or more processors.

Figure 2:
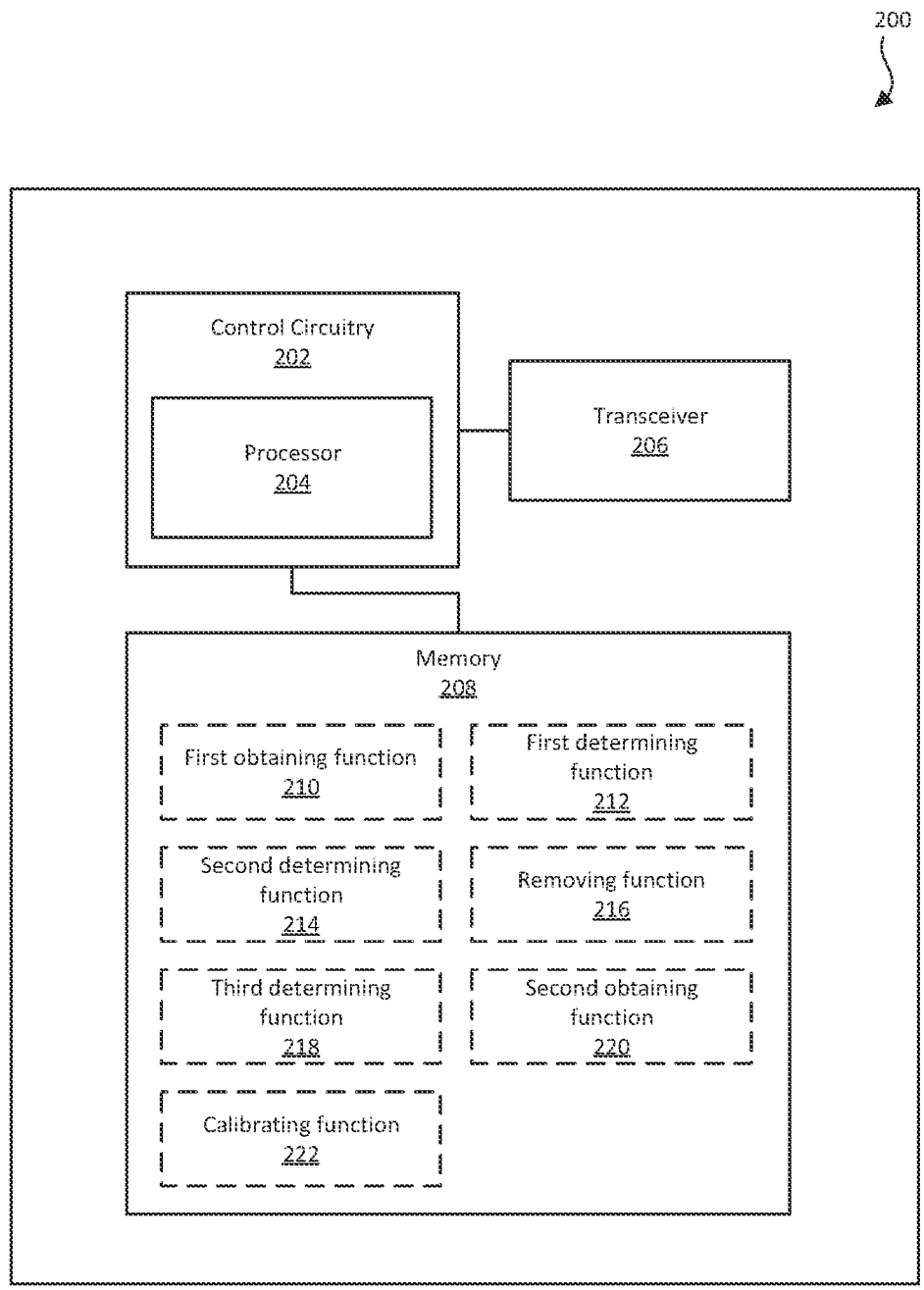
FIG. 2 is a device for calibrating a set of extrinsic parameters of a camera mounted on a vehicle in accordance with some embodiments of the present disclosure.

FIG. 2 is a device 200 for calibrating a set of extrinsic parameters of a camera mounted on a vehicle in accordance with some embodiments of the present disclosure. In particular, the device 200 is configured to perform the techniques of the method 100 described in the foregoing with reference to FIG. 1. The device 200 may be provided locally in a vehicle, such as the vehicle described below in connection with FIG. 3. However, as can be readily understood, the device 200 may be provided as an external device to the vehicle, such as a remote server. In such case, the device 200 may be communicatively connected to the vehicle.

The device 200 comprises control circuitry 202. The control circuitry 202 may physically comprise one single circuitry device. Alternatively, the control circuitry 202 may be distributed over several circuitry devices. As an example, the device 200 may share its control circuitry 202 with other parts of the vehicle, such as a control system of the vehicle.

As shown in FIG. 2, the device 200 may further comprise a transceiver 206 and a memory 208. The control circuitry 202 being communicatively connected to the transceiver 206 and the memory 208. The control circuitry 202 may comprise a data bus, and the control circuitry 202 may communicate with the transceiver 206 and/or the memory 208 via the data bus.

The control circuitry 202 may be configured to carry out overall control of functions and operations of the device 200. The control circuitry 202 may include a processor 204, such as a central processing unit (CPU), microcontroller, or microprocessor. The processor 204 may be configured to execute program code stored in the memory 208, in order to carry out functions and operations of the device 200. The control circuitry 202 is configured to perform the steps of the method 100 as described above in connection with FIG. 1. The steps may be implemented in one or more functions stored in the memory 208. In particular, the control circuitry 202 may be configured to execute a first obtaining function 210, a first determining function 212, a second determining function 214, a removing function 216, a third determining function 218, a second obtaining function 220, and a calibrating function 222. It should be noted that the various function and operation of the device 200 may be implemented in additional functions than those described herein. In addition, one or more of the above functions may be implemented together in a common function. For example, the first, second and third determining function 212, 214, 218 may be implemented in a single determining function. Similarly, the first and second obtaining function 210, 220 may be implemented in a single obtaining function.

The transceiver 206 may be configured to enable the device 200 to communicate with other devices. The transceiver 206 may both transmit data from and receive data to the device 200. For example, the device 200 may receive a sequence of images from a camera of the vehicle. Even though not explicitly illustrated in FIG. 2, the device may comprise user input devices such as one or more of a keyboard, a mouse, and a touchscreen.

The memory 208 may be a non-transitory computer-readable storage medium. The memory 208 may be one or more of a buffer, a flash memory, a hard drive, a removable media, a volatile memory, a non-volatile memory, a random access memory (RAM), or another suitable device. In a typical arrangement, the memory 208 may include a non-volatile memory for long term data storage and a volatile memory that functions as system memory for the device 200. The memory 208 may exchange data with the control circuitry 202 over the data bus. Accompanying control lines and an address bus between the memory 208 and the control circuitry 202 also may be present.

Functions and operations of the device 200 may be implemented in the form of executable logic routines (e.g., lines of code, software programs, etc.) that are stored on a non-transitory computer readable recording medium (e.g., the memory 208) of the device 200 and are executed by the control circuitry 202 (e.g. using the processor 204). Put differently, when it is stated that the control circuitry 202 is configured to perform a specific step or execute a specific function, the processor 204 of the control circuitry 202 may be configured execute program code portions stored on the memory 208, wherein the stored program code portions correspond to the specific step or function. Furthermore, the functions and operations of the control circuitry 202 may be a stand-alone software application or form a part of a software application that carries out additional tasks related to the control circuitry 202. The described functions and operations may be considered a method that the corresponding device is configured to carry out, such as the method 100 discussed above in connection with FIG. 1. Also, while the described functions and operations may be implemented in software, such functionality may as well be carried out via dedicated hardware or firmware, or some combination of one or more of hardware, firmware, and software.

In the following, the function and operations of the device 200 is described.

The control circuitry 202 is configured to obtain a sequence of images, captured by the camera, wherein each image of the sequence of images depicts a portion of a surrounding environment of the vehicle in a respective time instance of a plurality of time instances. This may be performed e.g. by execution of the first obtaining function 210.

The control circuitry 202 is further configured to determine a set of feature points in the sequence of images. This may be performed e.g. by execution of the first determining function 212.

The control circuitry 202 is further configured to determine an area representing a sky in the sequence of images. This may be performed e.g. by execution of the second determining function 214. Determining the area representing the sky may comprise, for each image of the sequence of images: determining a histogram of the image, and selecting a set of pixels having an intensity over a threshold in the histogram as the area representing the sky.

The control circuitry 202 is further configured to remove, from the set of feature points, a subset of feature points belonging to the area representing the sky. This may be performed e.g. by execution of the removing function 216.

The control circuitry 202 is further configured to determine a first motion trajectory of the vehicle over the plurality of time instances, based on the set of feature points. This may be performed e.g. by execution of the third determining function 218.

The control circuitry 202 is further configured to obtain a second motion trajectory of the vehicle over the plurality of time instances, wherein the second motion trajectory is based on motion data obtained from one or more other sensors of the vehicle. This may be performed e.g. by execution of the second obtaining function 220.

The control circuitry 202 is further configured to calibrate the set of extrinsic parameters of the camera by adjusting an extrinsic parameter of the camera based on a difference between the first motion trajectory and the second motion trajectory. This may be performed e.g. by execution of the calibrating function 222. Calibrating the set of extrinsic parameters may be performed in response to the difference between the first motion trajectory and the second motion trajectory is within a range.

The control circuitry 202 may be further configured to determine an area representing one or more moving objects in the sequence of images. Removing, from the set of feature points, the subset of feature points, may further comprise removing, from the set of feature points, an additional subset of feature points, the additional subset of feature points belonging to the area representing the one or more moving objects.

The control circuitry 202 may be further configured to store data relating to the first and/or second motion trajectory, in response to the difference between the first motion trajectory and the second motion trajectory being outside the range.

It should be noted that the principles, features, aspects, and advantages of the method 100 as described above in connection with FIG. 1, are applicable also to the device 200 as described herein. In order to avoid undue repetition, reference is made to the above.

Figure 3:
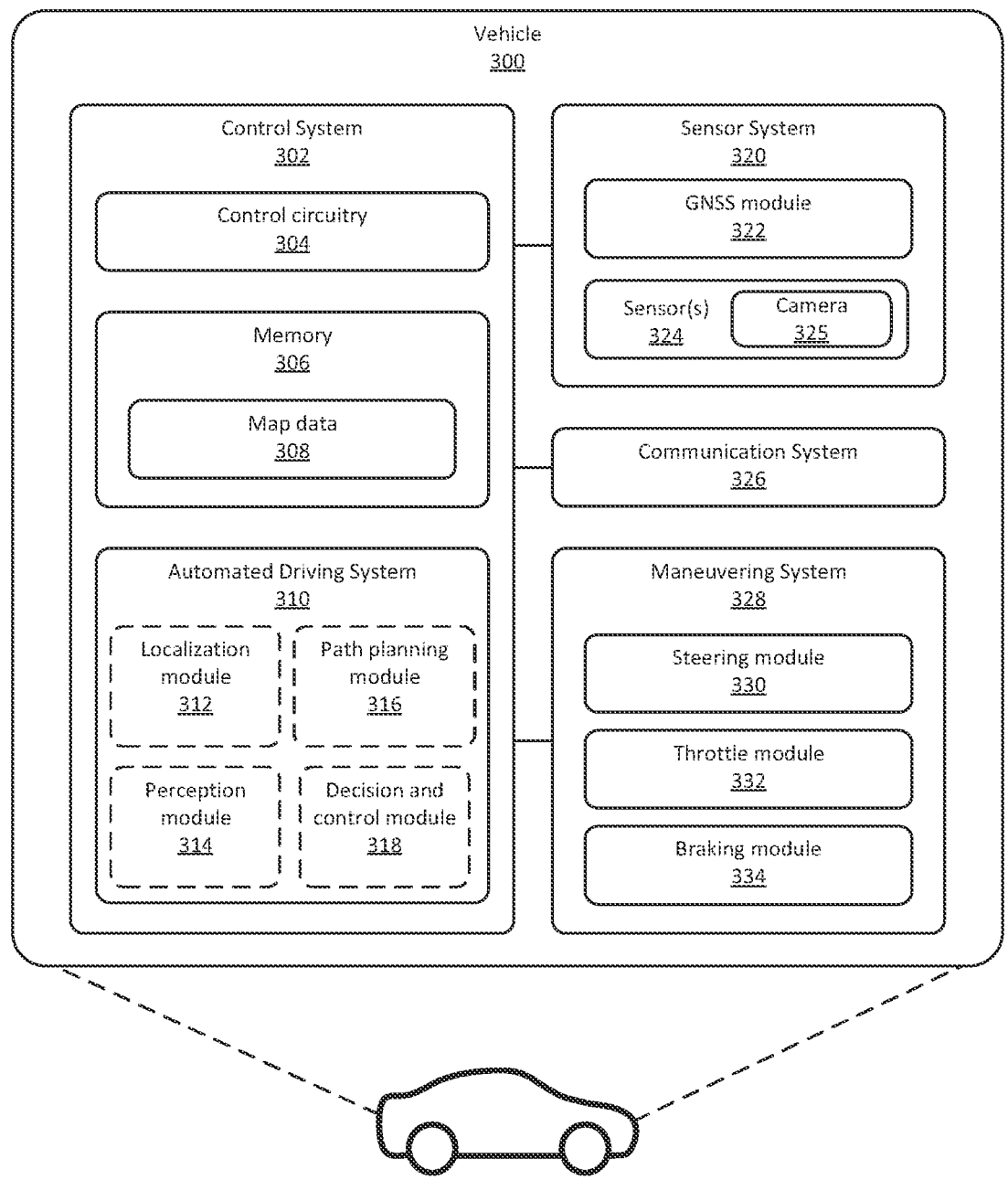
FIG. 3 schematically illustrates a vehicle in accordance with some embodiments of the present disclosure.

FIG. 3 schematically illustrates a vehicle 300 in accordance with some embodiments of the present disclosure. The vehicle 300 is enabled for performing the principles of the present technology for calibrating a set of extrinsic parameters of a camera 325 mounted on the vehicle 300. In the broadest example embodiment, the vehicle 300 comprises the camera 325 and a device 200 as described above in connection with FIG. 2. However, FIG. 3 illustrates more specifically a vehicle 300 equipped with an Automated Driving System (ADS) in accordance with some embodiments of the present disclosure.

More specifically, the vehicle 300 illustrated herein is a car. However, the vehicle 300 may be any form of motorized vehicle, such as a land (or road) vehicle, a surface vessel, or an aircraft.

The vehicle 300 comprises a number of elements which can be commonly found in autonomous vehicles. It will be understood that the vehicle 300 can have any combination of the various elements shown in FIG. 3. Moreover, the vehicle 300 may comprise further elements than those shown in FIG. 3. While the various elements is herein shown as located inside the vehicle 300, one or more of the elements can be located externally to the vehicle 300. For example, the map data 308 may be stored in a remote server and accessed by the various components of the vehicle 300 via the communication system 326. Further, even though the various elements are herein depicted in a certain arrangement, the various elements may also be implemented in different arrangements, as readily understood by the skilled person. It should be further noted that the various elements may be communicatively connected to each other in any suitable way. The vehicle 300 of FIG. 3 should be seen merely as an illustrative example, as the elements of the vehicle 300 can be realized in several different ways.

It should be understood that parts of the described solution may be implemented either in the vehicle 300, in a system located external the vehicle 300, or in a combination of internal and external the vehicle 300; for instance in a server in communication with the vehicle 300; a so called cloud solution. For instance, sensor data may be sent to an external system and that system performs the steps to compare a first and second motion trajectory and determine how the set of extrinsic parameters should be adjusted to calibrate the camera. The different features and steps of the embodiments may be combined in other combinations than those described.

The vehicle 300 comprises a control system 302. The control system 302 is configured to carry out overall control of functions and operations of the vehicle 300. The control system 302 comprises control circuitry 304 and a memory 306. The control circuitry 302 may physically comprise one single circuitry device. Alternatively, the control circuitry 302 may be distributed over several circuitry devices. As an example, the control system 302 may share its control circuitry 304 with other parts of the vehicle. The control circuitry 302 may comprise one or more processors, such as a central processing unit (CPU), microcontroller, or microprocessor. The one or more processors may be configured to execute program code stored in the memory 306, in order to carry out functions and operations of the vehicle 300. The processor(s) may be or include any number of hardware components for conducting data or signal processing or for executing computer code stored in the memory 306. The memory 306 optionally includes high-speed random access memory, such as DRAM, SRAM, DDR RAM, or other random access solid-state memory devices; and optionally includes non-volatile memory, such as one or more magnetic disk storage devices, optical disk storage devices, flash memory devices, or other non-volatile solid-state storage devices. The memory 306 may include database components, object code components, script components, or any other type of information structure for supporting the various activities of the present description.

The device 200 as described above in connection with FIG. 2 may share its control circuitry 202 with the control circuitry 304 of the vehicle 300. Thus, the device 200 may be implemented as part of the control system 302 of the vehicle 300. Alternatively, the device 200 may be implemented as part of any other system or module of the vehicle 300 such as the ADS 310 or a perception module 314 of the ADS 310 as further described below. Alternatively, the device 200 may be implemented as a separate module of the vehicle 300.

In the illustrated example, the memory 306 further stores map data 308. The map data 308 may for instance be used by the ADS 310 of the vehicle 300 in order to perform autonomous functions of the vehicle 300. The map data 308 may comprise high-definition (HD) map data. It is contemplated that the memory 306, even though illustrated as a separate element from the ADS 310, may be provided as an integral element of the ADS 310. In other words, according to some embodiments, any distributed or local memory device may be utilized in the realization of the present inventive concept. Similarly, the control circuitry 304 may be distributed e.g. such that one or more processors of the control circuitry 304 is provided as integral elements of the ADS 310 or any other system of the vehicle 300. In other words, according to some embodiments, any distributed or local control circuitry device may be utilized in the realization of the present inventive concept.

The ADS 310 is configured carry out the functions and operations of the autonomous functions of the vehicle 300. The ADS 310 may comprise a number of modules, where each module is tasked with different functions or features of the ADS 310. ADS features (may also be referred to as ADS functions) is a level 2 feature or higher according to SAE J3016 levels of driving automation for on-road vehicles. The ADS feature may for example be a traffic jam pilot, a highway pilot, or any other SAE J3016 level 3+ ADS feature. Some examples of modules of the ADS 310 is further described below.

The vehicle 300 further comprises a sensor system 320. The sensor system 320 is configured to acquire sensory data about the vehicle itself, or of its surroundings. The sensor system 320 may for example comprise a Global Navigation Satellite System (GNSS) module 322 (such as a GPS) configured to collect geographical position data of the vehicle 300. The sensor system 320 may further comprise one or more sensors 324. The sensor(s) 324 may be any type of on-board sensors, such as cameras, LIDARs, RADARs, ultrasonic sensors, gyroscopes, accelerometers, odometers, etc. It should be appreciated that the sensor system 320 may also provide the possibility to acquire sensory data directly or via dedicated sensor control circuitry in the vehicle 300. The camera 325 may be part of the sensor system 320. In other words, the camera 325 may be one of the sensor(s) 324. The sensor system 320 may further comprise other sensors than the camera 325 for determining the second motion trajectory as explained above in connection with FIGS. 1 and 2. The sensor system 320 may for instance comprise an inertial measurement unit (IMU).

The vehicle 300 further comprises a communication system 326. The communication system 326 is configured to communicate with external units, such as other vehicles (i.e. via vehicle-to-vehicle (V2V) communication protocols), remote servers (e.g. cloud servers), databases, or other external devices, i.e. vehicle-to-infrastructure (V2I) or vehicle-to-everything (V2X) communication protocols. The communication system 326 may communicate using one or more communication technologies. The communication system 326 may comprise one or more antennas (not shown). Cellular communication technologies may be used for long range communication such as to remote servers or cloud computing systems. In addition, if the cellular communication technology used have low latency, it may also be used for V2V, V2I, or V2X communication. Examples of cellular radio technologies are GSM, GPRS, EDGE, LTE, 5G, 5G NR, and so on, also including future cellular solutions. However, in some solutions mid to short range communication technologies may be used such as Wireless Local Area (LAN), e.g. IEEE 802.11 based solutions, for communicating with other vehicles in the vicinity of the vehicle 300 or with local infrastructure elements. ETSI is working on cellular standards for vehicle communication and for instance 5G is considered as a suitable solution due to the low latency and efficient handling of high bandwidths and communication channels.

The communication system 326 may accordingly provide the possibility to send output to a remote location (e.g. remote operator or control center) and/or to receive input from a remote location by means of the one or more antennas. Moreover, the communication system 326 may be further configured to allow the various elements of the vehicle 300 to communicate with each other. As an example, the communication system 326 may provide a local network setup, such as CAN bus, I2C, Ethernet, optical fibers, and so on. Local communication within the vehicle 300 may also be of a wireless type with protocols such as WiFi, LoRa, Zigbee, Bluetooth, or similar mid/short range technologies.

The vehicle 300 further comprises a maneuvering system 328. The maneuvering system 328 is configured to control the maneuvering of the vehicle 300. The maneuvering system 328 comprises a steering module 330 configured to control the heading of the vehicle 300. The maneuvering system 328 further comprises a throttle module 332 configured to control actuation of the throttle of the vehicle 300. The maneuvering system 328 further comprises a braking module 334 configured to control actuation of the brakes of the vehicle 300. The various modules of the maneuvering system 328 may also receive manual input from a driver of the vehicle 300 (i.e. from a steering wheel, a gas pedal and a brake pedal respectively). However, the maneuvering system 328 may be communicatively connected to the ADS 310 of the vehicle 300, to receive instructions on how the various modules of the maneuvering system 328 should act. Thus, the ADS 310 can control the maneuvering of the vehicle 300, for example via a decision and control module 318.

The ADS 310 may comprise a localization module 312 or localization block/system. The localization module 312 is configured to determine and/or monitor a geographical position and heading of the vehicle 300, and may utilize data from the sensor system 320, such as data from the GNSS module 322. Alternatively, or in combination, the localization module 312 may utilize data from the one or more sensors 324. The localization system may alternatively be realized as a Real Time Kinematics (RTK) GPS in order to improve accuracy. Geographical position of the ego-vehicle is in the present context to be construed as a map position (may also be referred to as in-map position) of the ego-vehicle. In other words, a geographical position or map position can be understood as a set (two or more) of coordinates in a global coordinate system.

The ADS 310 may further comprise a perception module 314 or perception block/system 314. The perception module 314 may refer to any commonly known module and/or functionality, e.g. comprised in one or more electronic control modules and/or nodes of the vehicle 300, adapted and/or configured to interpret sensory data—relevant for driving of the vehicle 300—to identify e.g. obstacles, vehicle lanes, relevant signage, appropriate navigation paths, etc. The perception module 314 may thus be adapted to rely on and obtain inputs from multiple data sources, such as automotive imaging, image processing, computer vision, and/or in-car networking, etc., in combination with sensory data e.g. from the sensor system 320.

The localization module 312 and/or the perception module 314 may be communicatively connected to the sensor system 320 in order to receive sensory data from the sensor system 320. The localization module 312 and/or the perception module 314 may further transmit control instructions to the sensor system 320.

The ADS may further comprise a path planning module 316. The path planning module 316 is configured to determine a planned path of the vehicle 300 based on a perception and location of the vehicle as determined by the perception module 314 and the localization module 312 respectively. A planned path determined by the path planning module 316 may be sent to the maneuvering system 328 for execution.

The ADS may further comprise a decision and control module 318. The decision and control module 318 is configured to perform the control and make decisions of the ADS 310. For example, the decision and control module 318 may decide on whether the planned path determined by the path-planning module 316 should be executed or not.

Figure 4:
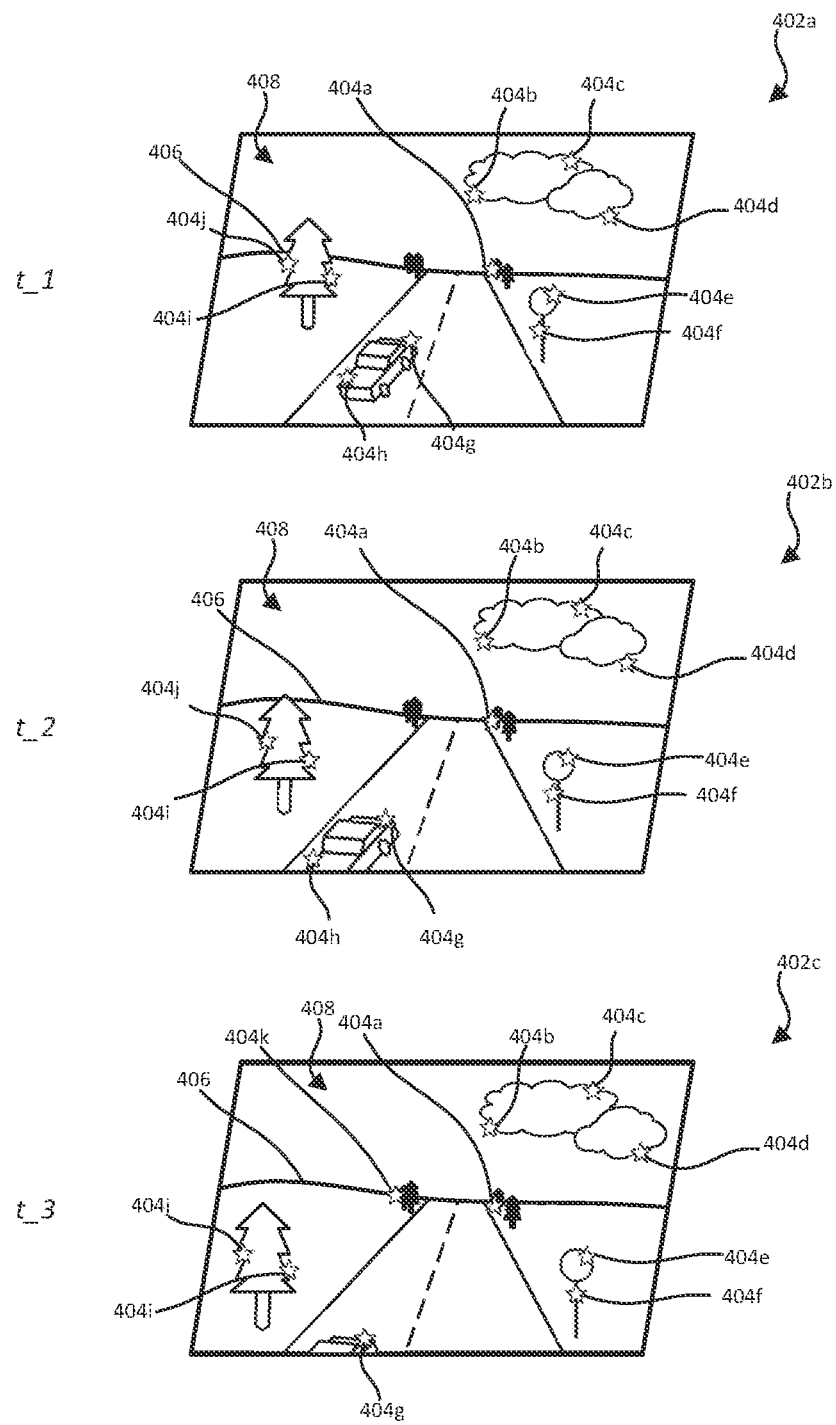
FIG. 4 illustrates a sequence of images with feature points.

FIG. 4 illustrates, by way of example, a sequence of images with feature points for improved understanding. The illustrative example shows a sequence of three images, namely a first image 402a at a first time instance $t\_1$, a second image 402b at a second time instance $t\_2$ and a third image 402c at a third time instance $t\_3$. The first thorough third time instances should be seen as three consecutive time instances. However, the principles of the present disclosure may be applied over any number of images, and thus over any number of time instances.

The first, second and third images 402a, 402b, 402c herein represent different views of the surrounding environment of a moving vehicle, in the three consecutive time instances. Objects in the images therefore appear to be moving towards a camera capturing the images. It should however be appreciated that the images are just for illustrative purposes, and should not be seen as representative of a real world scenario. For example, relative sizes, shapes and perspectives of objects shown in the first to third images 402a-c may not represent a real world scenario.

What is further shown in FIG. 4 (and in each of the images 402a-c) is a number of feature points 404a-k, represented by star shapes. The number and placement of the feature points 404a-k should not be seen as limiting, but merely as an illustrative example. The feature points 404a-k may form the set of feature points as described in the foregoing. As is further indicated by the images 402a-c, different feature points may be determined in the different images. For instance, feature point denoted 404k in the third image 402c, is not present in the first and second image 402a, 402b. Further, the feature point denoted 404h, which is present in the first and second images 402a, 402b, is not present in the third image 402c.

Feature points belonging to an area representing a sky 408 is excluded from the set of feature points when determining the first motion trajectory. The area representing the sky 408 may e.g. be the area above the horizon 406. Herein, the feature points denoted 404b, 404c and 404d, which are belonging to clouds, are excluded. Further, feature points belonging to moving objects may also be removed, such as the feature points denoted 404g and 404h, which belongs to an oncoming vehicle.

The present inventive concept has been presented above with reference to specific embodiments. However, other embodiments than the above described are possible and within the scope of the inventive concept. Different method steps than those described above, performing the method by hardware or software, may be provided within the scope of the inventive concept. Thus, according to some embodiments, there is provided a non-transitory computer-readable storage medium storing one or more programs configured to be executed by one or more processors of a vehicle control system, the one or more programs comprising instructions for performing the method 100 according to any one of the above-discussed embodiments. In addition, a computer program product is provided according to some embodiments, the computer program product comprising instructions which, when the program is executed by a computing device, causes the computing device to carry out the method 100 according to any one of the above-discussed embodiments. Alternatively, according to some other embodiments a cloud computing system can be configured to perform any of the methods presented herein. The cloud computing system may comprise distributed cloud computing resources that jointly perform the methods presented herein under control of one or more computer program products.

It is to be noted that, a computer-accessible medium may include any tangible or non-transitory storage media or memory media such as electronic, magnetic, or optical media—e.g., disk or CD/DVD-ROM coupled to computer system via bus. The terms "tangible" and "non-transitory," as used herein, are intended to describe a computer-readable storage medium (or "memory") excluding propagating electromagnetic signals, but are not intended to otherwise limit the type of physical computer-readable storage device that is encompassed by the phrase computer-readable medium or memory. For instance, the terms "non-transitory computer-readable medium" or "tangible memory" are intended to encompass types of storage devices that do not necessarily store information permanently, including for example, random access memory (RAM). Program instructions and data stored on a tangible computer-accessible storage medium in non-transitory form may further be transmitted by transmission media or signals such as electrical, electromagnetic, or digital signals, which may be conveyed via a communication medium such as a network and/or a wireless link.

It should be noted that any reference signs do not limit the scope of the claims, that the inventive concept may be at least in part implemented by means of both hardware and software, and that several "means" or "units" may be represented by the same item of hardware.

Although the figures may show a specific order of method steps, the order of the steps may differ from what is depicted. In addition, two or more steps may be performed concurrently or with partial concurrence. Such variation will depend on the software and hardware systems chosen and on designer choice. All such variations are within the scope of the inventive concept. Likewise, software implementations could be accomplished with standard programming techniques with rule-based logic and other logic to accomplish the various connection steps, processing steps, comparison steps and decision steps. The above mentioned and described embodiments are only given as examples and should not be limiting to the present inventive concept. Other solutions, uses, objectives, and functions within the scope of the inventive concept as claimed in the below described patent claims should be apparent for the person skilled in the art.

As used herein, the term "if" may be construed to mean "when" or "upon" or "in response to" depending on the context. Similarly, the phrase "if it is determined" or "when it is determined" or "in an instance of" may be construed to mean "upon determining" or "in response to determining" or "upon detecting and identifying occurrence of an event" or "in response to detecting occurrence of an event" depending on the context.

As used herein, the wording "one or more of" a set of elements (as in "one or more of A, B and C" or "at least one of A, B and C") is to be interpreted as either a conjunctive or disjunctive logic. Put differently, it may refer either to all elements, one element or combination of two or more elements of a set of elements. For example, the wording "one or more of A, B and C" may be interpreted as A or B or C, A and B and C, A and B, B and C, or A and C.

The invention claimed is:

1. A computer-implemented method for calibrating a set of extrinsic parameters of a camera mounted on a vehicle, the method comprising:

obtaining a sequence of images, captured by the camera, wherein each image of the sequence of images depicts a portion of a surrounding environment of the vehicle in a respective time instance of a plurality of time instances;

determining a set of feature points in the sequence of images;

determining an area representing a sky in the sequence of images;

removing, from the set of feature points, a subset of feature points, the subset of feature points belonging to the area representing the sky, thereby forming an updated set of feature points;

determining a first motion trajectory of the vehicle over the plurality of time instances, based on the updated set of feature points;

obtaining a second motion trajectory of the vehicle over the plurality of time instances, wherein the second motion trajectory is based on motion data obtained from one or more other sensors of the vehicle; and calibrating the camera by adjusting the set of extrinsic parameters of the camera based on a difference between the first motion trajectory and the second motion trajectory.

2. The method according to claim 1, wherein the vehicle is equipped with an Automated Driving System (ADS) and wherein the camera is part of a vision system of the ADS.

3. The method according to claim 1, further comprising:
determining an area representing one or more moving objects in the sequence of images; and
wherein removing, from the set of feature points, the subset of feature points, further comprises removing, from the set of feature points, an additional subset of feature points, the additional subset of feature points belonging to the area representing the one or more moving objects.

4. The method according to claim 3, wherein determining the area representing the moving object is performed using machine leaning based object detection.

5. The method according to claim 1, wherein the set of extrinsic parameters of the camera comprises information about a position and/or an orientation of the camera in relation to the vehicle.

6. The method according to claim 1, wherein calibrating the camera is performed in response to the difference between the first motion trajectory and the second motion trajectory being within a range.

7. The method according to claim 6, wherein, in response to the difference between the first motion trajectory and the second motion trajectory being outside the range, the method further comprises storing data relating to the first and/or second motion trajectory.

8. The method according to claim 1, wherein determining the area representing the sky comprises, for each image of the sequence of images:
determining a histogram of the image; and
selecting a set of pixels having an intensity over a threshold in the histogram as the area representing the sky.

9. The method according to claim 1, wherein determining the area representing the sky of the sequence of images is performed by semantic segmentation.

10. The method according to claim 1, wherein a feature point of the set of feature points is associated with an object in the surrounding environment of the vehicle.

11. The method according to claim 1, wherein the camera is calibrated by adjusting the set of extrinsic parameters based on the difference between the first motion trajectory and the second motion trajectory such that said difference is minimized.

12. The method according to claim 1, wherein the one or more other sensors comprise at least one of an accelerometer, a gyroscope, a wheel encoder, a LIDAR, and a further camera of the vehicle.

13. A non-transitory computer readable storage medium comprising instructions which, when executed by a computing device, causes the computing device to carry out the method according to claim 1.

14. A device for calibrating a set of extrinsic parameters of a camera mounted on a vehicle, the device comprising control circuitry configured to:
obtain a sequence of images, captured by the camera, wherein each image of the sequence of images depicts a portion of a surrounding environment of the vehicle in a respective time instance of a plurality of time instances;
determine a set of feature points in the sequence of images;
determine an area representing a sky in the sequence of images;
remove, from the set of feature points, a subset of feature points belonging to the area representing the sky;
determine a first motion trajectory of the vehicle over the plurality of time instances, based on the set of feature points;
obtain a second motion trajectory of the vehicle over the plurality of time instances, wherein the second motion trajectory is based on motion data obtained from one or more other sensors of the vehicle; and
calibrate the set of extrinsic parameters of the camera by adjusting an extrinsic parameter of the camera based on a difference between the first motion trajectory and the second motion trajectory.

15. A vehicle comprising:
a camera mounted on the vehicle, and
a device for calibrating the camera mounted on the vehicle, the device comprising control circuitry configured to:
obtain a sequence of images, captured by the camera, wherein each image of the sequence of images depicts a portion of a surrounding environment of the vehicle in a respective time instance of a plurality of time instances;
determine a set of feature points in the sequence of images;
determine an area representing a sky in the sequence of images;
remove, from the set of feature points, a subset of feature points belonging to the area representing the sky;
determine a first motion trajectory of the vehicle over the plurality of time instances, based on the set of feature points;
obtain a second motion trajectory of the vehicle over the plurality of time instances, wherein the second motion trajectory is based on motion data obtained from one or more other sensors of the vehicle; and
calibrate the set of extrinsic parameters of the camera by adjusting an extrinsic parameter of the camera based on a difference between the first motion trajectory and the second motion trajectory.

* * * * *